United States Patent
Xiong et al.

(10) Patent No.: US 8,670,050 B2
(45) Date of Patent: Mar. 11, 2014

(54) IMAGE PROCESSING DEVICE AND METHOD FOR DETERMINING SIMILARITIES BETWEEN TWO IMAGES

(75) Inventors: Yu-Kai Xiong, Shenzhen (CN); Xin Lu, Shenzhen (CN); Shih-Fang Wong, New Taipei (TW); Hui-Feng Liu, Shenzhen (CN); Dong-Sheng Lv, Shenzhen (CN); Yu-Yong Zhang, Shenzhen (CN); Jian-Jian Zhu, Shenzhen (CN); Xiang-Lin Cheng, Shenzhen (CN); Xuan-Fen Huang, Shenzhen (CN); Xiao-Shan Zhou, Shenzhen (CN); An-Lin Jiang, Shenzhen (CN); Xin-Hua Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 39 days.

(21) Appl. No.: 13/494,147

(22) Filed: Jun. 12, 2012

(65) Prior Publication Data
US 2013/0223750 A1 Aug. 29, 2013

(30) Foreign Application Priority Data
Feb. 24, 2012 (CN) .......................... 2012 1 0043061

(51) Int. Cl.
*H04N 5/202* (2006.01)
(52) U.S. Cl.
USPC ........ 348/254; 348/222.1; 348/241; 382/218; 382/222
(58) Field of Classification Search
USPC ................ 382/222, 218; 348/222.1, 241, 254
See application file for complete search history.

(56) References Cited

U.S. PATENT DOCUMENTS

| | | | |
|---|---|---|---|
| 6,516,087 B1 * | 2/2003 | Camus | 382/154 |
| 7,893,975 B2 * | 2/2011 | Zimmer et al. | 348/254 |
| 2008/0088858 A1 * | 4/2008 | Marcu et al. | 358/1.6 |
| 2010/0302234 A1 * | 12/2010 | Kao et al. | 345/419 |

* cited by examiner

*Primary Examiner* — Antoinette Spinks
(74) *Attorney, Agent, or Firm* — Altis Law Group, Inc.

(57) ABSTRACT

A computerized method determines similarities between a first image and a second image. The first image is converted into a first grayscale image, and the second image is converted into a second grayscale image, where a number of pixels of the second image is not less than a number of pixels of the first image. Each pixel of the first grayscale image is matched with a pixel of the second grayscale image to create a pixel pair sequence. A similarity value indicating the similarities between the first image and the second image is calculated according to the grayscale value of each pixel in the pixel pair sequence S.

8 Claims, 2 Drawing Sheets

IMAGE PROCESSING DEVICE AND METHOD FOR DETERMINING SIMILARITIES BETWEEN TWO IMAGES

BACKGROUND

1. Technical Field

Embodiments of the present disclosure relate to image processing technologies, and particularly to an image processing device and a method for determining similarities between two images.

2. Description of Related Art

Determination of similarities between two images is very important for image matching or image comparison. Typical methods for determining the similarities between two images are based on pixel comparison and feature comparison. However, such methods based on the pixel comparison may be inaccurate when one of the two images has been rotated to a different orientation. Additionally, the method based on the feature comparison is carried out by extracting basic features of the two images, such as grayscale features and texture features, and then comparing the basic features of the two images to obtain the similarities between the two images. The method based on the feature comparison may reflect an overall similarities between the two images, which cannot reflect detail similarities between the two images. Therefore, an improved solution for determining the similarities between two images is desired.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
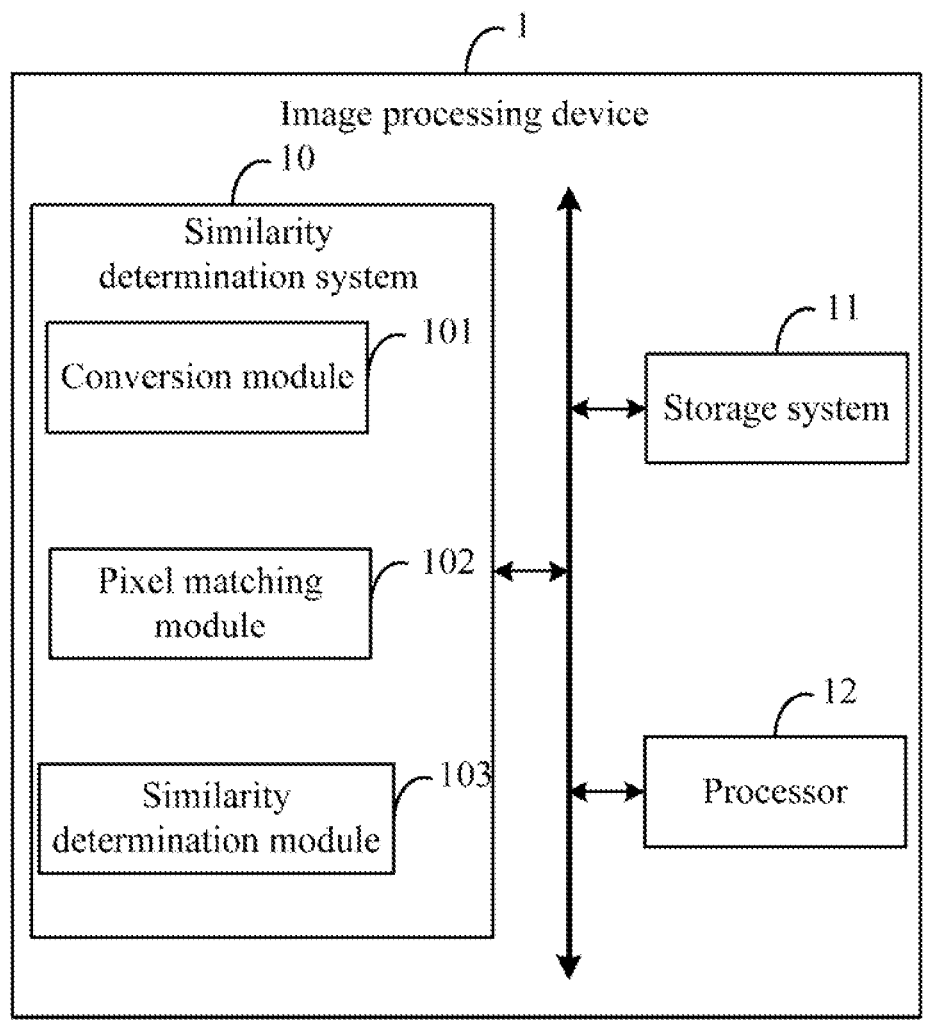
FIG. 1 is a schematic block diagram illustrating one embodiment of an image processing device including a similarity determination system.

FIG. 1 illustrates one embodiment of an image processing device 1. The image processing device 1 includes a similarity determination system 10, a storage system 11, and at least one processor 12. The similarity determination system 10 is executed by the at least one processor 12 for determining similarities between a first image and a second image. In the embodiment, the number of pixels of the second image is not less than the number of pixels of the first image. The first image and the second image is prestored in the storage system 11. The image processing device 1 may be, a computer, an image processing sever, or other similar device, for example. FIG. 1 is one example of the image processing device 1, and the image processing device 1 can include more or fewer components than those shown in the embodiment, or have a different configuration of the components.

The similarity determination system 10 may include a plurality of programs in the form of one or more computerized instructions stored in the storage system 11 and executed by the processor 12 to perform operations of the image processing device 1. In the embodiment, the similarity determination system 10 includes a conversion module 101, a pixel matching module 102, and a similarity determination module 103. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The conversion module 101 converts the first image into a first grayscale image and the second image into a second grayscale image. The conversion module 101 may convert the first image and the second image according to values of red, green, and blue (RGB) of each pixel of the first image and the second image. For example, the conversion module 101 may calculate a grayscale value of each pixel of the first image using a formula, such as: $G=R*0.3+G*0.59+B*0.11$, and then generate the first grayscale image according to the grayscale value of each pixel of the first image. The second image can be converted using the same method as described above.

The pixel matching module 102 matches each pixel of the first grayscale image with a corresponding pixel of the second grayscale image to create a pixel pair sequence $S=\{(P_i, P'_j), 1 \leq i \leq n, 1 \leq j \leq m, n \leq m,\}$. In which $P_i$ represents the pixel of the first grayscale image, $P'_j$ represents the pixel of the second grayscale image matched with the pixel $P_i$, n represents the number of the pixels of the first grayscale image, and m represents the number of the pixels of the second grayscale image. The created pixel pair sequence S satisfies the conditions of: $\{(P_i, P'_j)|\Sigma D_{ij} \to \min, 1 \leq i \leq n, 1 \leq j \leq m\}$, and $D_{ij}=|V_i-V'_j|$, in which $V_i$ represents a grayscale value of the pixel $P_i$, $V'_j$ represents a grayscale value of the pixel $P'_j$. The value $D_{ij}$ indicates the similarity between the pixel $P_i$ and $P'_j$. The pixel pair sequence S is defined as a particular sequence having elements of the each pixel pair $(P_i, P'_j)$. Each of the pixel pairs includes a pixel $P_i$ of the first grayscale image and a pixel $P'_j$ of the second grayscale image that is matched with the pixel $P_i$.

In one example, the pixel matching module 102 can create the pixel pair sequence S using an exhaustive search method or a backtracking method. During the pixel matching between the first grayscale image and the second grayscale image using the exhaustive search method or the backtracking method, there may be K matching ways between the pixel $P_i$ of the first grayscale image and the pixel $P'_j$ of the second grayscale image, and K pixel pair sequences $S_1, S_2, \ldots, S_k$ may be obtained corresponding to the K matching ways. Then, the pixel matching module 102 calculates a value $D_k = (P_i, P'_j)|\Sigma D_{ij}$, $1 \leq i \leq n$, $1 \leq j \leq m$ according to each of the pixel pair sequences $S_1, S_2, \ldots, S_k$, and regards one of the pixel pair sequences $S_1, S_2, \ldots, S_k$ corresponding to the minimum value among $D_1$ to $D_k$ as the created pixel pair sequence S.

The similarity determination module 103 calculates a similarity value $S(I_a, I_b)$ indicating the similarities between the first image and the second image according to the grayscale value of each pixel in the pixel pair sequence S, where $I_a$ represents the first image, and $I_b$ represents the second image. The similarity determination module 103 calculates the similarity value according to a formula of:

$$S(I_a, I_b) = \frac{1}{n} \sum_{(P_i, P'_j) \in S} \frac{1}{D_{ij}},$$

$$1 \leq i \leq n, 1 \leq j \leq m.$$

In this embodiment, when $D_{ij}$ that is calculated according to a particular pixel pair $(P_i, P'_j)$ is equal to 0, the value of $$\frac{1}{D_{ij}}$$

is regarded as 1. In this embodiment, a range interval of the calculated similarity value S(Ia, Ib) is [0,1]. The larger the similarity value S(Ia, Ib) is, indicating that the first image is more similar to the second image.

Figure 2:
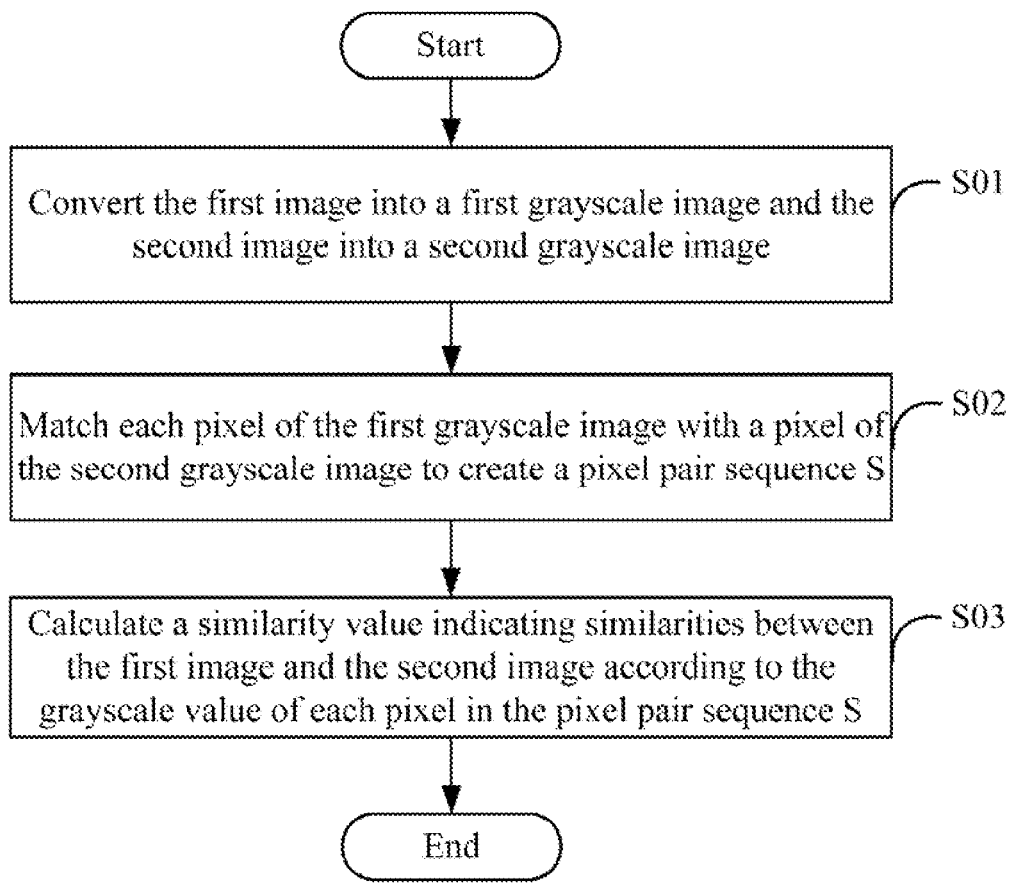
FIG. 2 is a flowchart of one embodiment showing a method for calculating a similarity between two images using the image processing device of FIG. 1.

FIG. 2 is a flowchart of one embodiment of a method for determining similarities between the first image and the second image using the image processing device of FIG. 1. Depending on the embodiment, additional steps may be added, others removed, and the ordering of the steps may be changed.

In step S01, the conversion module 101 converts the first image into a first grayscale image, and the second image into a second grayscale image.

In step S02, the pixel matching module 102 matches each pixel of the first grayscale image with a pixel of the second grayscale image to create a pixel pair sequence S={(Pi, P' j), 1≤i≤n, 1≤j≤m, n≤m,}, where Pi represents the pixel of the first grayscale image, P'j represents the pixel of the second grayscale image that is matched with the pixel Pi, n represents the number of the pixels of the first grayscale image, and m represents the number of the pixels of the second grayscale image. Additionally, the created pixel pair sequence S satisfies the conditions of: {(Pi, P'j)|ΣDij→min, 1≤i≤n, 1≤j≤m}, and Dij=|Vi−V'j|, in which Vi represents a grayscale value of the pixel Pi, V'j represents a grayscale value of the pixel P'j. The value Dij indicates the similarity between the pixel Pi and P'j.

In step S03, the similarity determination module 103 calculates a similarity value S(Ia, Ib) indicating the similarities between the first image and the second image according to the grayscale value of each pixel in the pixel pair sequence S. The similarity determination module 103 calculates the similarity value according to the formula described in paragraph [0012].

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for determining similarities between a first image and a second image using an image processing device, the method comprising:
  converting the first image into a first grayscale image and the second image into a second grayscale image, wherein the first image and the second image is pre-stored in a storage system of the image processing device, and a number of pixels of the second image is not less than the number of pixels of the first image;
  matching each pixel of the first grayscale image with a corresponding pixel of the second grayscale image to create a pixel pair sequence S={(Pi, P'j), 1≤i≤n, 1≤j≤m, n≤m,}, wherein the created pixel pair sequence S satisfies the conditions of: {(Pi, P'j)|ΣDij→min, 1≤i≤n, 1≤j≤m}, and Dij=|Vi−V'j|, Pi represents the pixel of the first grayscale image, P'j represents the pixel of the second grayscale image that is matched with the pixel Pi, n represents the number of the pixels of the first grayscale image, m represents the number of the pixels of the second grayscale image, Vi represents a grayscale value of the pixel Pi, and V'j represents a grayscale value of the pixel P'j; and
  calculating a similarity value indicating similarities between the first image and the second image according to the grayscale value of each pixel in the pixel pair sequence S.

2. The method according to claim 1, wherein the similarity value is calculated according to a formula of:

$$S(Ia, Ib) = \frac{1}{n} \sum_{(Pi, P'j) \in S} \frac{1}{Dij},$$

$$1 \le i \le n, 1 \le j \le m,$$

where S(Ia, Ib) represents the similarity value, and the value of $$\frac{1}{Dij}$$

is regarded as 1 when Dij that is calculated according to a particular pixel pair (Pi, P'j) is equal to 0.

3. The method according to claim 2, wherein the matching step comprises:
  obtaining K matching ways between the pixel Pi of the first grayscale image and the pixel P'j of the second grayscale image using an exhaustive search method or a backtracking method;
  creating K pixel pair sequences S1, S2, . . . , Sk according to the K matching ways; and
  calculating a value Dk=(Pi, P'j)|ΣDij, 1≤i≤n, 1≤j≤m according to each of the pixel pair sequences S1, S2, . . . , Sk, and regarding one of the pixel pair sequences S1, S2, . . . , Sk corresponding to the minimum value among D1 to Dk as the pixel pair sequence S.

4. The method according to claim 1, wherein the calculated similarity value is greater than or equal to 0 and less than or equal to 1, the larger the similarity value is, indicating that the first image is more similar to the second image.

5. An image processing device, comprising:
  a storage system that stores a first image and a second image, wherein a number of pixels of the second image is not less than the number of pixels of the first image;
  at least one processor;
  one or more programs stored in the storage system and executed by the at least one processor, the one or more programs comprising:
  a conversion module that converts the first image into a first grayscale image and the second image into a second grayscale image;
  a pixel matching module that matches each pixel of the first grayscale image with a pixel of the second grayscale image to create a pixel pair sequence S={(Pi, P'j), 1≤i≤n, 1≤j≤m, n≤m,}, wherein the created pixel pair sequence S satisfies the conditions of: {(Pi, P'j)|ΣDij→min, 1≤i≤n, 1≤j≤m}, and Dij=|Vi−V'j|, Pi represents the pixel of the first grayscale image, P'j represents the pixel of the second grayscale image that is matched with the pixel Pi, n represents the number of the pixels of the first grayscale image, m represents the number of the pixels of the second grayscale image, Vi represents a grayscale value of the pixel Pi, and V'j represents a grayscale value of the pixel P'j; and
  a similarity determination module that calculates a similarity value indicating similarities between the first image and the second image according to the grayscale value of each pixel in the pixel pair sequence S.

6. The image processing device according to claim 5, wherein the similarity value is calculated according to a formula of:

$$S(Ia, Ib) = \frac{1}{n} \sum_{(Pi, P'j) \in S} \frac{1}{Dij},$$

$$1 \le i \le n, 1 \le j \le m,$$

where S(Ia, Ib) represents the similarity value, and the value of $$\frac{1}{Dij}$$

is regarded as 1 when Dij that is calculated according to a particular pixel pair (Pi, P'j) is equal to 0.

7. The image processing device according to claim 6, wherein the pixel pair sequence S is created by:
   obtaining K matching ways between the pixel Pi of the first grayscale image and the pixel P'j of the second grayscale image using an exhaustive search method or a backtracking method;
   creating K pixel pair sequences S1, S2, ..., Sk according to the K matching ways; and
   calculating a value Dk=(Pi, P' j)|ΣDij, 1≤i≤n, 1≤j≤m according to each of the K pixel pair sequences S1, S2, ..., Sk, and regarding one of the pixel pair sequences S1, S2, ..., Sk corresponding to the minimum value among D1 to Dk as the pixel pair sequence S.

8. The image processing device according to claim 5, wherein the calculated similarity value is greater than or equal to 0 and less than or equal to 1, the larger the similarity value is, indicating that the first image is more similar to the second image.

* * * * *